United States Patent
Harduf et al.

(10) Patent No.: US 10,691,373 B2
(45) Date of Patent: Jun. 23, 2020

(54) OBJECT HEADERS FACILITATING STORAGE OF DATA IN A WRITE BUFFER OF A STORAGE SYSTEM

(71) Applicant: EMC IP Holding Company LLC, Hopkinton, MA (US)

(72) Inventors: Yuval Harduf, Yahud (IL); Zvi Schneider, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 112 days.

(21) Appl. No.: 16/038,612

(22) Filed: Jul. 18, 2018

(65) Prior Publication Data
US 2020/0026459 A1   Jan. 23, 2020

(51) Int. Cl.
*G06F 3/06* (2006.01)
*G06F 11/14* (2006.01)

(52) U.S. Cl.
CPC .......... *G06F 3/0656* (2013.01); *G06F 3/061* (2013.01); *G06F 3/067* (2013.01); *G06F 3/0631* (2013.01); *G06F 3/0638* (2013.01); *G06F 11/141* (2013.01)

(58) Field of Classification Search
CPC .......... G06F 2003/0691; G06F 11/141; G06F 3/0656; G06F 3/067; G06F 3/0638; G06F 3/0631; G06F 3/0644; G06F 2003/0695; G06F 9/5044; G06F 9/5033; G06F 13/387; H04L 49/9047; H04L 49/90
See application file for complete search history.

(56) References Cited

U.S. PATENT DOCUMENTS 7,298,746 B1 * 11/2007 De La Iglesia ......... H04L 47/10
                                                          370/394
7,444,464 B2   10/2008 Urmston et al.
8,095,726 B1    1/2012 O'Connell et al.
(Continued)

FOREIGN PATENT DOCUMENTS

WO      2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — David Yi
*Assistant Examiner* — Tahilba O Puche
(74) *Attorney, Agent, or Firm* — Ryan, Mason & Lewis, LLP

(57) ABSTRACT

An apparatus in one embodiment comprises at least one processing device comprising a processor coupled to a memory. The processing device is configured to receive a request to write a given data object to a write buffer of at least one storage system, to allocate an entry in the write buffer, to generate a header for the given data object comprising a first portion indicating a validation status, to write the header to the allocated entry of the write buffer with the first portion of the header comprising a value indicating invalid status, to write the given data object to the allocated entry of the write buffer, and to update the header of the allocated entry by modifying the value of the first portion of the header to indicate valid status responsive to a successful write of the given data object to the allocated entry of the write buffer.

20 Claims, 6 Drawing Sheets

(56) References Cited

U.S. PATENT DOCUMENTS

| | | |
|---|---|---|
| 8,214,612 B1 | 7/2012 | Natanzon |
| 9,104,326 B2 | 8/2015 | Frank et al. |
| 9,208,162 B1 | 12/2015 | Hallak et al. |
| 9,286,003 B1 | 3/2016 | Hallak et al. |
| 9,606,870 B1 | 3/2017 | Meiri et al. |
| 9,716,754 B2 | 7/2017 | Swift |
| 2008/0279462 A1 | 11/2008 | Celi, Jr. |
| 2009/0073999 A1* | 3/2009 | Craddock ............ G06F 13/126 370/412 |
| 2009/0132955 A1 | 5/2009 | Garg et al. |
| 2010/0179941 A1 | 7/2010 | Agrawal et al. |
| 2011/0225362 A1* | 9/2011 | Leggette ............. G06F 12/1425 711/114 |
| 2013/0325824 A1 | 12/2013 | Shoens |
| 2014/0181016 A1 | 6/2014 | Whitehead et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtrernIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages N. Tolia et al., "Opportunistic Use of Content Addressable Storage for Distributed File Systems," Proceedings of the USENIX Annual Technical Conference, Jun. 9-14, 2003, 14 pages.

EMC Corporation, "Emc Recoverpoint Replication of XtremIO: Understanding the Essentials of RecoverPoint Snap-Based Replication for XtremIO," EMC White Paper, Aug. 2015, 31 pages.

U.S. Appl. No. 15/884,577, filed in the name of Zvi Schneider et al. on Jan. 31, 2018 and entitled "Storage System with Decoupling and Reordering of Logical and Physical Capacity Removal."

* cited by examiner

OBJECT HEADERS FACILITATING STORAGE OF DATA IN A WRITE BUFFER OF A STORAGE SYSTEM

FIELD

The field relates generally to information processing systems, and more particularly to storage in information processing systems.

BACKGROUND

In many information processing systems, storage systems are provided which utilize a disk or other storage media for storing data. In some cases, writing to the disk or other storage media is considered "expensive" in terms of the time it takes to achieve such writes. Thus, some storage systems implement intermediate write buffers using memory components which may be written to faster than the disk or other storage media of the storage system. Several writes to the memory components implementing the intermediate write buffers may be aggregated into one write to the disk or other storage media of the storage system. Atomicity of transactions may be required, and are achieved by writing metadata to the intermediate write buffers. However, conventional approaches to managing storage of data in such intermediate write buffers can be problematic. For example, in some storage systems, memory components used to implement an intermediate write buffer are subject to various constraints which limit usage. These and other related inefficiencies can significantly undermine system performance.

SUMMARY

Illustrative embodiments provide techniques for generating and validating object headers used to store data in a write buffer of a storage system, overcoming various constraints associated with memory components used to implement the write buffer. Such arrangements enable, for example, storage of data which exceeds alignment and size constraints of the memory components used to implement the write buffer. Through facilitating storage of data in the write buffer that exceeds the alignment, size and other constraints of the memory components used to implement the write buffer, improvements in storage system performance are provided.

In one embodiment, an apparatus comprises at least one processing device comprising a processor coupled to a memory. The processing device is configured to receive a request to write a given data object to a write buffer of at least one storage system, to allocate an entry in the write buffer for storage of the given object, and to generate a header for the given data object, the header comprising a first portion indicating a validation status of the given data object. The processing device is further configured to write the header for the given data object to the allocated entry of the write buffer with the first portion of the header comprising a value indicating an invalid status for the given data object, to write the given data object to the allocated entry of the write buffer, and to update the header of the allocated entry by modifying the value of the first portion of the header to indicate a valid status for the given data object responsive to a successful write of the given data object to the allocated entry of the write buffer.

The processing device in some embodiments is implemented in a host device configured to communicate over a network with at least one storage system that implements the write buffer. In other embodiments, the processing device is implemented in at least one storage system that implements the write buffer. These are only examples, and alternative implementations are possible.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
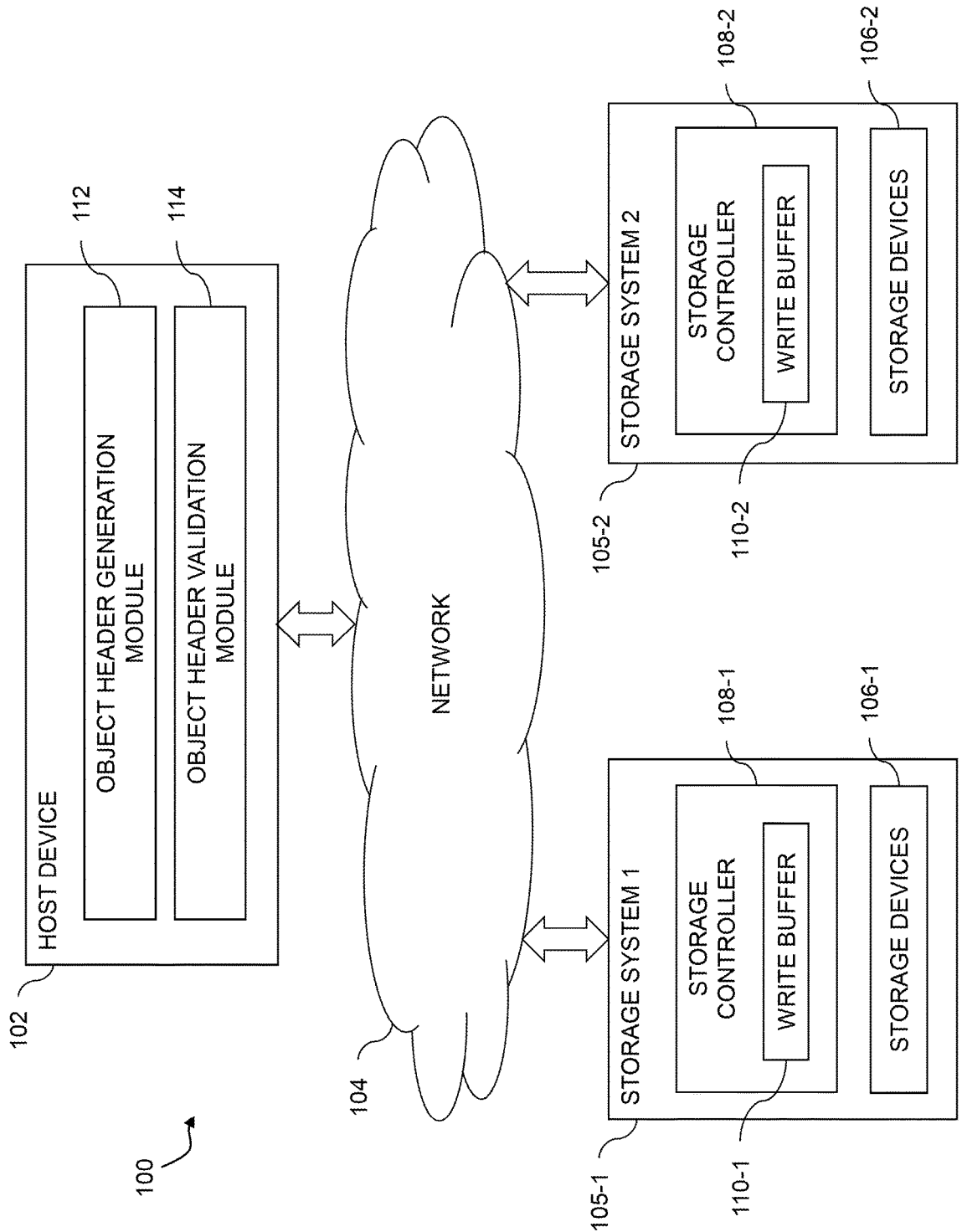
FIG. 1 is a block diagram of an information processing system comprising a host device configured with functionality for generating and validating object headers for storage of data in a write buffer of a storage system in an illustrative embodiment.

FIG. 1 shows an information processing system 100 configured in accordance with an illustrative embodiment. The information processing system 100 comprises a host device 102, which may comprise one of a plurality of host devices of a computer system. The host device 102 communicates over a network 104 with first and second storage systems 105-1 and 105-2, also denoted as Storage System 1 and Storage System 2, respectively. The storage systems 105-1 and 105-2 are collectively referred to herein as storage systems 105. The host device 102 and storage systems 105 may be part of an enterprise computing and storage system, a cloud-based system or another type of system.

The host device 102 and storage systems 105 illustratively comprise respective processing devices of one or more processing platforms. For example, the host device 102 and the storage systems 105 can each comprise one or more processing devices each having a processor and a memory, possibly implementing virtual machines and/or containers, although numerous other configurations are possible.

The host device 102 and the storage systems 105 can additionally or alternatively be part of cloud infrastructure such as an Amazon Web Services (AWS) system. Other examples of cloud-based systems that can be used to provide one or more of host device 102 and storage systems 105 include Google Cloud Platform (GCP) and Microsoft Azure.

The host device 102 is configured to write data to and read data from the storage systems 105. The host device 102 and the storage systems 105 may be implemented on a common processing platform, or on separate processing platforms. A wide variety of other types of host devices can be used in other embodiments.

The host device 102 in some embodiments illustratively provides compute services such as execution of one or more applications on behalf of each of one or more users associated with the host device 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage systems 105 are accessible to the host device over the network 104. The storage system 105-1 comprises a plurality of storage devices 106-1 and an associated storage controller 108-1. Similarly, the storage system 105-2 comprises a plurality of storage devices 106-2 and an associated storage controller 108-2. The storage devices 106-1 and 106-2 are collectively referred to herein as storage devices 106. The storage controllers 108-1 and 108-2 are collectively referred to as storage controllers 108. The storage controllers 108-1 and 108-2 implement respective write buffers 110-1 and 110-2, which are collectively referred to as write buffers 110. Although shown in FIG. 1 as being internal to the storage controllers 108, one or more of the write buffers 110 may be implemented at least in part external to the storage controllers 108. In some embodiments, the write buffers 110 may be implemented within storage devices 106, in host device 102, or at least partially in an additional device coupled to network 104.

The write buffers 110 illustratively comprise memory components that utilize non-volatile memory (NVM) providing fast (e.g., random access memory (RAM)-grade) write performance. For example, the memory components implementing the write buffers 110 may include non-volatile RAM (NVRAM), phase-change RAM (PC-RAM), magnetic RAM (MRAM), etc. These and various combinations of multiple different types of NVM devices may also be used in some embodiments for the memory components implementing the write buffers 110.

The storage devices 106 illustratively comprise solid state drives (SSDs). Such SSDs are implemented using NVM devices such as flash memory. Other types of NVM devices that can be used to implement at least a portion of the storage devices 106 include NVRAM, PC-RAM and MRAM. These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, at least one of the storage systems 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement one or both of storage systems 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The host device 102 in the FIG. 1 embodiment includes object header generation module 112 and object header validation module 114, which collectively provide logic and functionality for generating and validating object headers used to store data in the write buffers 110 of storage systems 105, overcoming various constraints associated with memory components used to implement the write buffers 110. Such logic and functionality is configured to implement a process for generating and validating object headers such as that illustrated in the flow diagram of FIG. 3. The host device 102 should also be understood to include additional modules and other components typically found in conventional implementations of computers, servers or other host devices, although such additional modules and other components are omitted from the figure for clarity and simplicity of illustration.

The object header generation module 112 is configured to generate specially-formulated headers for data objects to be written to the write buffers 110 of storage systems 105 to overcome various constraints associated with the memory components used to implement the write buffers 110. The object header validation module 114 is configured to validate headers stored in the write buffers 110, and to provide functionality for application recovery procedures (e.g., on reboot or other recovery from journal involving object headers stored in the write buffers 110). The write buffers 110 in some embodiments may be viewed as implementing a journal or other system for logging writes to the storage systems 105.

Generally, the memory components implementing write buffers 110: (i) provide fast (e.g., RAM-grade) write performance; (ii) are persistent (e.g., power loss should not cause data loss); and (iii) provide atomic writes (e.g., metadata writes are either fully written or not at all, because otherwise transactions cannot be implemented). The memory components implementing write buffers 110 are also assumed to impose various constraints on write access, and are thus different from "regular" RAM. Such constraints include constraints related to write address alignment and size. For example, the memory components are assumed to require that write address and size are aligned (e.g., to 4, 8, 16 bytes, etc.) otherwise garbage may be written. As another example, the memory components are assumed to only guarantee atomicity if a write does not cross a defined alignment boundary (e.g., 32, 64 bytes, etc.) and when a write is no larger than N Bytes (e.g., where N is 64, 128, etc.) in size. These behaviors limit the usage of such memory components, in that the memory components are only able to write small amounts of data, and with address alignment limitations.

For example, suppose an object to be written to one of the write buffers 110 is 102 bytes long, and the memory components implementing the write buffers 110 have a 4 byte alignment constraint, an alignment boundary of 64 bytes, and a maximum atomic write size of 64 bytes. Writing this object to the write buffer 110 will encounter various issues. An alignment issue is presented as writing the object as-is may result in corruption. Further, there are atomicity issues as the object crosses the 64 byte alignment boundary and is more than the maximum atomic write size of 64 bytes. It should be appreciated that the particular values for the alignment constraint, alignment boundary and maximum atomic write size above are presented by way of example only, and that embodiments are not limited to these particular values. In other embodiments, the memory components implementing write buffers 110 may utilize other values for the alignment constraint, alignment boundary and/or maximum atomic write size. Further, while in the above example the values for the alignment boundary and maximum atomic write size are the same (e.g., 64 bytes), this is not a requirement. In some cases, the alignment boundary and maximum atomic write size may have different values.

Given the above behavioral limitations of the memory components implementing write buffers 110, techniques are needed to enable the storage systems 105 to store "large" amounts of data, where "large" in this context refers to data that exceeds one or more of the constraints of the write buffers 110. One such technique is to separate writes into two parts that are stored in different partitions. The data is written into a data partition, where the data may be large (e.g., 4,000 bytes). A chunk of metadata is written to a metadata partition. The metadata chunks are designed to be small enough to be aligned and atomic in accordance with the constraints of the write buffers 110. The metadata points to the data stored in the data partition, and thus the data is made "persistent." Techniques are needed, however, for persisting large objects or data without requiring the use of multiple partitions in the memory components implementing write buffers 110. For example, in some instances a two-partition strategy may not be applicable such as when implementing management elements or a key-value store.

In order to support persistence of large data into the write buffers 110, embodiments provide for the generation and validation of specialized headers for data objects as described below. The term "object" as used herein refers to data of some length that is to be atomically persisted to one or more of the write buffers 110 of storage systems 105. In some embodiments, it is assumed that each object is limited in size (e.g., the objects may be up to 4,000 bytes) and has a unique identifier (e.g., an "object type"+"object id"). The memory components implementing the write buffers 110 are further assumed in some embodiments to include a predefined partition allocated for persisting objects, or a journal. Further, the objects are assumed in some embodiments to eventually be removed from the write buffers 110 and written to other media (e.g., disks or other storage media of storage devices 106).

The object header generation module 112 is configured to generate headers for objects to be written or stored to the write buffers 110. The header for a given object may include three portions or fields. The first portion, also referred to as a validation portion, is a field of a legal, aligned size for an atomic write (e.g., 4 bytes, 8 bytes, etc.). The second portion, also referred to as an identification portion, is a field indicating a unique identifier for the given object. The unique identifier (e.g., a u64 type or unsigned 64-bit value) may be application-specific, and may be given by a calling application layer of the host device 102. The third portion, also referred to as a size portion, is a field indicating the size of the given object.

The object header generation module 112 in some embodiments is configured to receive requests to write data (e.g., in the form of objects) to the write buffers 110 of storage systems 105. On receiving a request to write a given object, the object header generation module 112 allocates an empty or invalid entry from the write buffer 110 for the given object. The object header generation module 112 further finds any existing entries in the write buffer 110 having the same unique identifier as the given object to be written. This may occur, for example, if the given object was previously written to the write buffer 110, and has subsequently changed and is to be written again to the write buffer 110. In some instances, there may be duplicate entries for the given object in the write buffer 110, as there should be a valid object in the write buffer 110 at all times even if there is a power failure or other disruption in the middle of a write operation.

The object header generation module 112, on allocating the new entry and finding any existing entries for the given object to be written to the write buffer 110, writes an "invalid" header for the given object in the new entry. This may involve, for example, setting a value for the validation portion of the header that indicates an invalid entry (e.g., 0) and writing the appropriate values for the given object to the size and unique identifier portions of the header. The data for the given object is then written to the write buffer 110. At this point, the given object is already fully written to the write buffer 110, but it is not considered "valid" because the validation portion of the header was initially set to a value indicating an invalid entry (e.g., 0). After the object data has been written, the entry may then be validated by the object header validation module 114. The object header validation module 114 re-writes the value of the validation portion of the header for the given object in the new entry with a proper value (e.g., one which indicates a valid entry, such as 0x5a5a5a). This operation should be atomic. The object header validation module 114, after validating the new entry in the write buffer 110, will if necessary invalidate any old or existing entries for the given object. This involves re-writing the validation portion of the header for the given object in such old or existing entries with an invalid value (e.g., 0). Again, this operation should be atomic.

The above functionality provides for application recovery, such as on reboot or any other recovery from journal for the write buffer 110. Application recovery may involve the object header validation module 114 going through all entries in the object pool of write buffer 110. For entries having headers with validation portions set to invalid values (e.g., 0), the entries are determined to be invalid and are skipped. Otherwise, entries are valid.

At the end of the recovery procedure, there may be instances where there are two valid entries for the same unique object identifier. This may occur, for example, where a failure occurs during the write procedure after the validation portion of the header in the new entry for the given object is updated to a valid value but before the validation portion of the header in the old entry for the given object is updated to an invalid value. In such instances, one entry is picked or determined to be valid (e.g., a first encountered entry) and all other entries are invalidated. This is permissible, as the calling application on the host device 102 which initiated the write of the given object should know how to recover if a new entry should be written but the system reset just before the write (e.g., the scenario where the "old" entry is taken as the valid one), or if the new entry should be written, and was written, but the system reset right after the write (e.g., the scenario where the "new" entry is taken as the valid one). In either case, the calling application will consider the write operation legal or permissible and be able to recover.

A more detailed explanation of the procedure for generating and validating object headers will now be provided. A variable "Object_Max_Size" is defined as the maximum object size plus the header size, aligned to fit the memory constraints of the memory components implementing the write buffers 110. For example, the "Object_Max_Size" may be 1,000 bytes, 2,000 bytes, 4,000 bytes, etc. A variable "Object_Pool" is defined as a consecutive section of the memory, which is of size M*Object_Max_Size. Each Object_Max_Size section is an entry of index m, where m= 0 . . . M−1. This may be visualized as an array of M entries of size Object_Max_Size. A variable "Object_Validation" controls whether an entry in the write buffer 110 is considered as valid. In some embodiments, the Object_Validation variable is set to 0 for an invalid entry and to a number (e.g., an integer number, a hexadecimal number, etc.) that is not equal to 0 for valid entries. In other embodiments, different values may be assigned to Object_Validation to denote valid and invalid entries.

At initialization, it is assumed that the designated portion of the write buffers 110 are written with zeroes or other null values. To write an object, the object header generation module 112 receives a request (e.g., from an application on host device 102) to write an object. This may involve invoking a function such as Write(Object, Object_Unique_ID, Object_Size), where Object is the data to be written (e.g., a consecutive byte array), Object_Unique_ID is the unique identifier for the object to be written, and Object_Size is the size of the object to be written. The object header generation module 112 selects an entry in the write buffer 110 (e.g., allocating an empty entry denoted "new_idx" from an object pool Object_Pool and returning the found index new_idx). The object header generation module 112 further searches the write buffer 110 for any existing entry having the same Object_Unique_ID. If any existing entry is found, that index (e.g., "old_idx") is returned. If no existing entry is found, this operation returns "None" or another value indicating that there are no existing entries having the same Object_Unique_ID as the current write request.

The object header generation module 112 then generates a header, which involves setting values for the validation portion, the size portion and the unique identifier portion described above. For the validation portion, a value indicating an invalid entry is initially set for the header (e.g., header.Object_Validation=0). For the size portion a value indicating Object_Size is set (e.g., header.Object_Size= Object_Size), and for the identifier portion a value indicating Object_Unique_ID is set (e.g., header.Object_Unique_ ID=Object_Unique_ID). As noted above, the Object_ Unique_ID may be given by the calling or requesting application on the host device 102, and may be a concatenation of an object type and object identifier (e.g., object type+object id). The object header generation module 112 writes the generated header to the write buffer 110 in the selected entry (e.g., new_idx). The object header generation module 112 then writes the data (e.g., Object) after the header in the write buffer 110 consecutively. It should be noted that writing the data (e.g., Object) to the write buffer 110 is not atomic and, if interrupted, is not consistent.

After the data is written to the write buffer 110, the object header validation module 114 updates the validation portion of the header by writing a value indicating a valid entry (e.g., header.Object_Validation=0x5a5a5a). The particular value of the validation portion of the header (e.g., 0x5a5a5a) may vary as desired, so long as the value is designated as belonging to a valid entry. It should be noted that writing the updated validation portion of the header to the write buffer 110 is atomic and consistent. Next, the object header validation module 114 invalidates any old or existing entries by updating their corresponding header validation portions. For example, if old_idx !=None, the object header validation module 114 updates the validation portion of the entry old_idx with a value indicating an invalid entry (e.g., header.Object_Validation=0). Updating the validation portion of the header for the old_idx entry, similar to updating the validation portion of the header for the new_idx entry, is atomic and consistent.

The host device 102 and storage systems 105 in the FIG. 1 embodiment are assumed to be implemented using at least one processing platform each comprising one or more processing devices each having a processor coupled to a memory. Such processing devices can illustratively include particular arrangements of compute, storage and network resources.

The host device 102 and the storage systems 105 may be implemented on respective distinct processing platforms, although numerous other arrangements are possible. For example, in some embodiments at least portions of the host device 102 and one or both of the storage systems 105 are implemented on the same processing platform. The storage systems 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage systems 105 to reside in different data centers. Numerous other distributed implementations of one or both of the host device 102 and the storage systems 105 are possible. Accordingly, the storage systems 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host device 102, network 104, storage systems 105, storage devices 106, storage controllers 108 and write buffers 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing object header generation and validation functionality will be described below.

Figure 2:
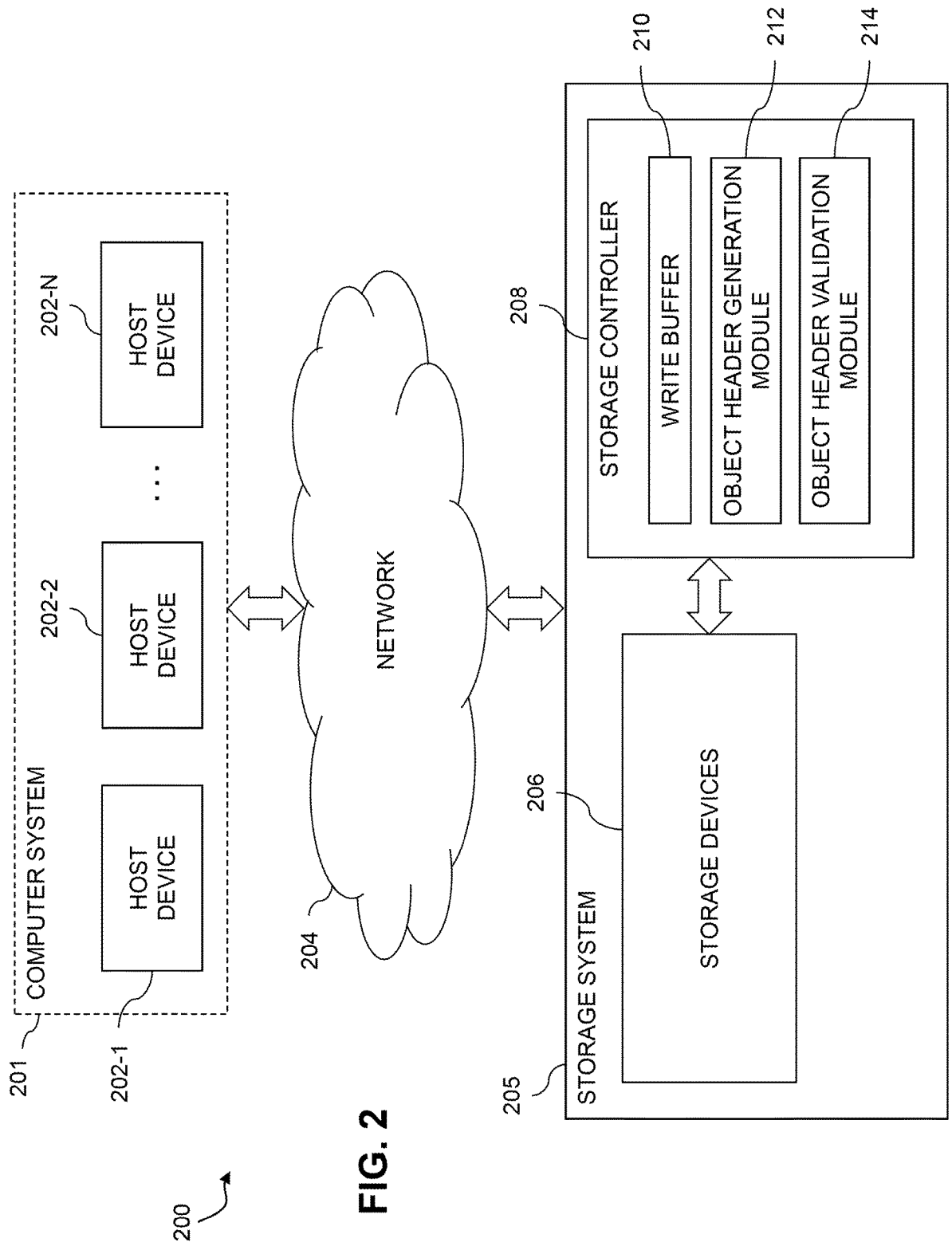
FIG. 2 is a block diagram of an information processing system comprising a storage system configured with functionality for generating and validating object headers for storage of data in a write buffer of a storage system in an illustrative embodiment.

FIG. 2 shows an information processing system 200 configured in accordance with another illustrative embodiment. The information processing system 200 comprises a computer system 201 that includes host devices 202-1, 202-2, . . . 202-N. The host devices 202 communicate over a network 204 with a storage system 205. The computer system 201 is assumed to comprise an enterprise computer system, cloud-based computer system or other arrangement of multiple compute nodes associated with respective users. The host devices 202 of the computer system 201 in some embodiments illustratively provide compute services such as execution of one or more applications on behalf of each of one or more users associated with respective ones of the host devices 202.

Similar to the storage systems 105 of system 100, the storage system 205 comprises storage devices 206, storage controller 208 and write buffer 210. However, in this embodiment, the object header generation and validation functionality is implemented in the storage system 205, rather than in one of the host devices 202. Accordingly, the storage controller 208 in this embodiment comprises modules 212 and 214, which are configured to operate in substantially the same manner as that described above for respective corresponding modules 112 and 114 of the host device 102 in the system 100.

In some embodiments, functionality for object header generation and validation can be implemented partially in a host device and partially in a storage system. Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

The operation of the information processing systems 100 and 200 will now be described in further detail with reference to the flow diagram of the illustrative embodiment of FIG. 3. The process as shown includes steps 300 through 310, and is suitable for use in systems 100 and 200 but is more generally applicable to other types of information processing systems in which a host device or storage system is configured to generate and validate object headers for storing objects to intermediate write buffers. The steps are illustratively performed at least in part under the control of the object header generation module 112 and object header validation module 114 in host device 102 of system 100 or in modules 212 and 214 in storage controller 208 of system 200.

In step 300, a request to write a given data object to a write buffer (e.g., 110, 210) of at least one storage system (e.g., 105, 205) is received. The write buffer may have various associated constraints, such as an alignment constraint specifying that data stored therein must be aligned to a first designated size value, an alignment boundary constraint specifying that data objects stored therein must not cross a second designated size value, and an atomic write size constraint specifying a third designated size value corresponding to a maximum size of a data object for an atomic write to the write buffer. The given data object that is the subject of the write request received in step 300 may violate one or more of the constraints of the write buffer. Using the techniques described herein, however, permits storage of the given data object in the write buffer notwithstanding violation of such constraints.

In step 302, an entry is allocated in the write buffer for storage of the given object. The allocated entry may comprise an existing entry in the write buffer with a header having a first portion with a value indicating an invalid status for its associated data object. The allocated entry may alternately comprise a new or not previously allocated entry in the write buffer.

In step 304, a header is generated for the given data object. The header for the given data object may include a number of portions, such as a first portion indicating a validation status of the given data object. The header is written to the allocated entry of the write buffer with the first portion thereof having a value indicating an invalid status for the given object in step 306. In step 308, the given data object is written to the allocated entry of the write buffer. The given data object may be written consecutively after the header in the allocated entry of the write buffer.

In response to a successful write of the given data object to the allocated entry of the write buffer, the header of the allocated entry is updated in step 310 to modify the value of the first portion of the header to indicate a valid status for the given data object. In some embodiments, the header for the given data object further includes a second portion that indicates a unique identifier for the given data object. In such embodiments, step 302 may further comprise searching the write buffer for an existing entry with a header having a second portion with the unique identifier for the given data object, and step 310 may further comprise updating the header of the existing entry by modifying a value of a first portion thereof to indicate an invalid status responsive to the successful write of the given data object to the allocated entry of the write buffer. The operations of updating the headers of the allocated and existing entries in step 310 may be atomic writes. The unique identifier for the given data object may be provided by an application that is a source of the write request, and may comprise a first portion indicating an object type and a second portion indicating an object identifier.

In some embodiments, the write buffer implements a journal for writes which may be recovered after reboot or other failure using the validation status of the headers for the data objects stored therein. When during recovery of the journal provided by the write buffer at least two entries thereof have headers with first portions indicating valid status for a same data object, this may be resolved by selecting one of the at least two entries as a valid entry and invalidating remaining ones of the at least two entries by modifying values of the first portions of the headers thereof to indicate invalid status.

Figure 3:
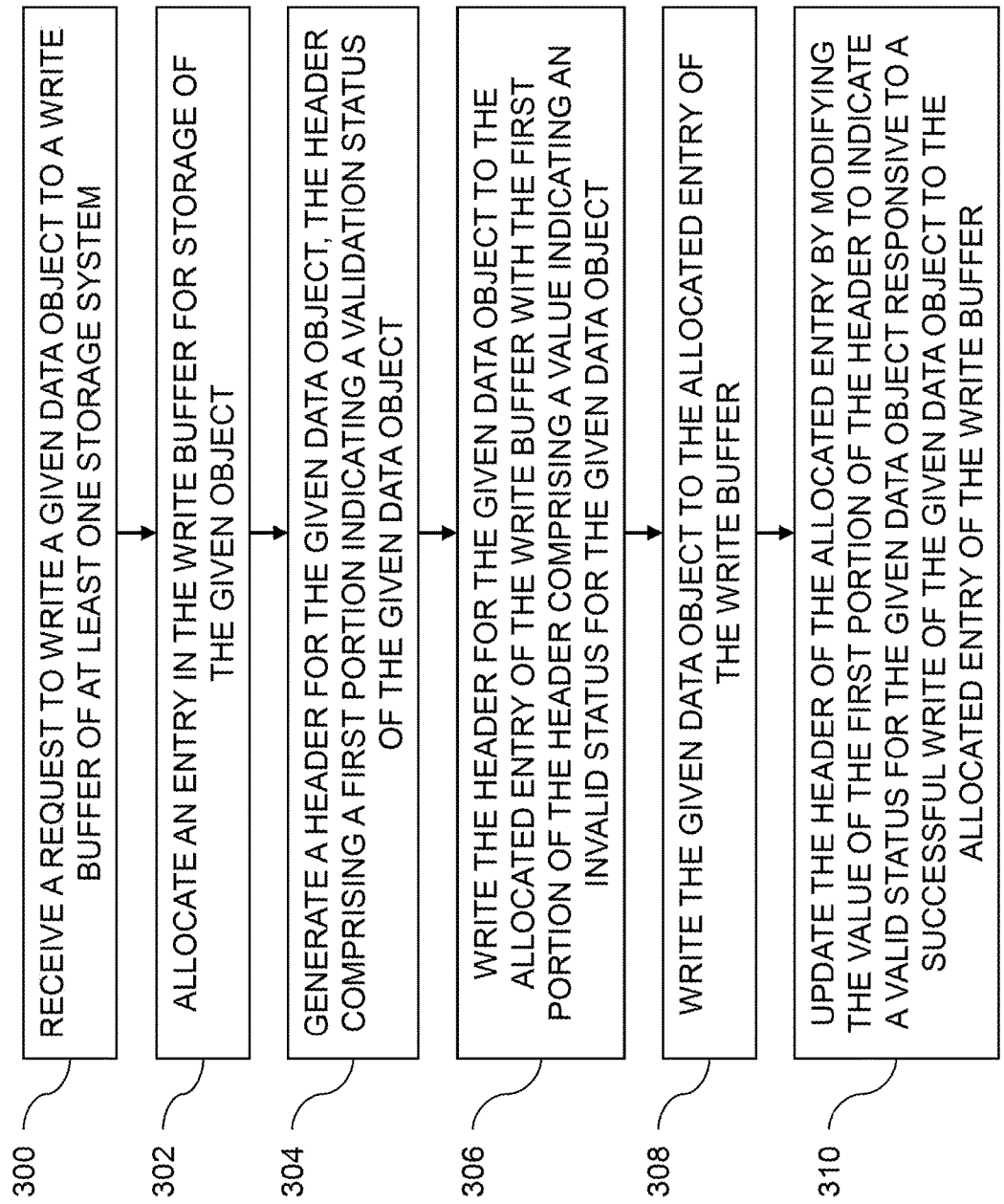
FIG. 3 is a flow diagram of a process for generating and validating object headers for storage of data in a write buffer of a storage system in an illustrative embodiment.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for generating and validating object headers for storing objects in write buffers. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different object header generation and validation processes for different journals or portions of a particular write buffer or write buffers, or for different storage systems or portions thereof within a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 208 that is configured to control performance of one or more steps of the FIG. 3 process in its corresponding system 100 or 200 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host device 102 of system 100 or the storage controller 208 of system 200, as well as other system components, may be implemented at least in part using processing devices of such processing platforms. For example, in a distributed implementation of the storage controller 208, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate object header generation and validation techniques as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of the storage system 205, and accordingly is assumed to be coupled to host devices 202 of computer system 201 via network 204 within information processing system 200.

The storage controller 408 in the present embodiment is configured to implement object header generation and validation functionality of the type previously described in conjunction with FIGS. 1 through 3 for storing objects in write buffer 410.

The storage controller 408 includes distributed modules 412 and 414, which are configured to operate in a manner similar to that described above for respective corresponding modules 112, 212 and 114, 214.

Figure 4:
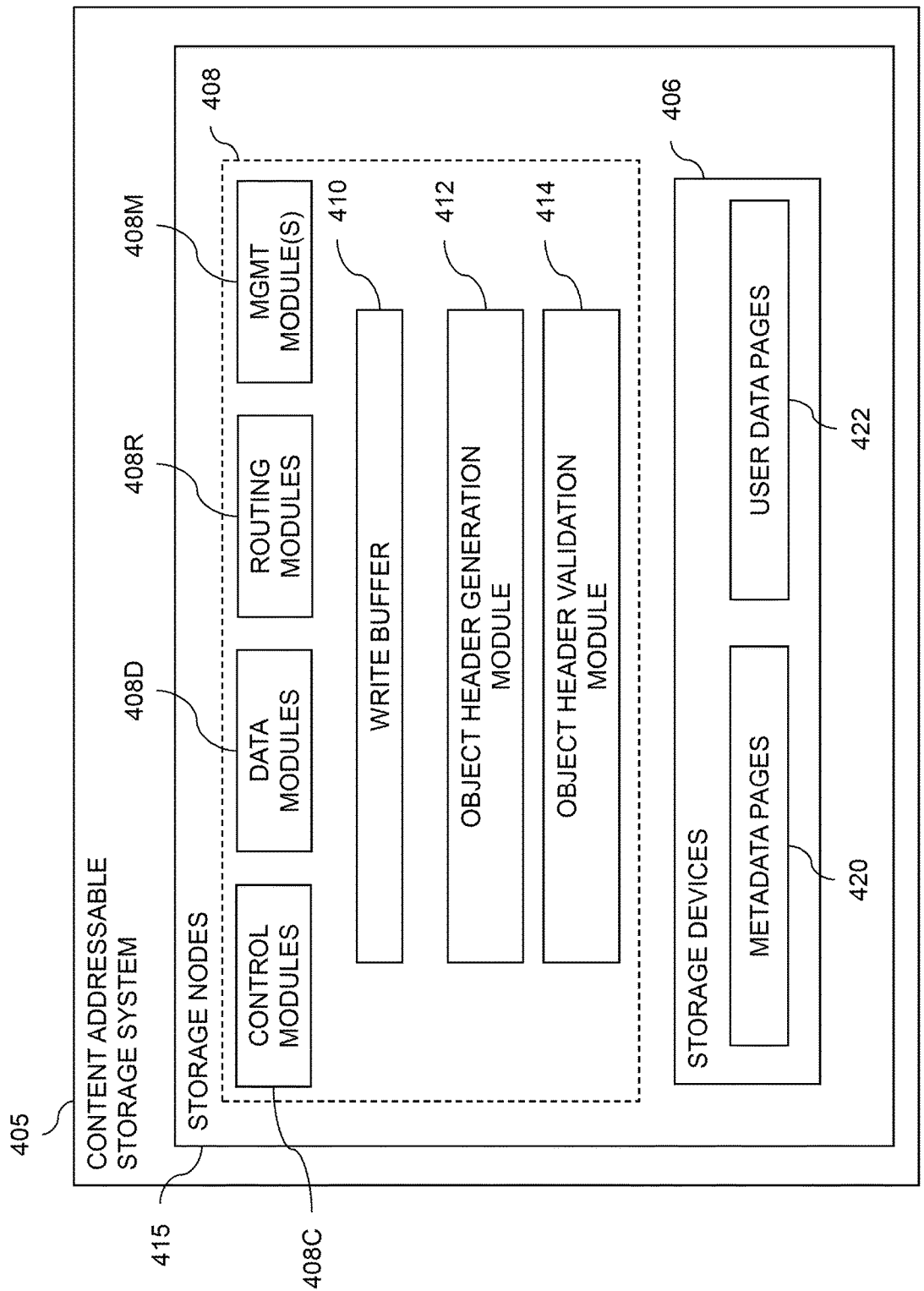
FIG. 4 shows a content addressable storage system having a distributed storage controller configured with functionality for generating and validating object headers for storage of data in a write buffer of a storage system in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 204. Alternatively, such additional storage nodes may be part of another clustered storage system of the system 200. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP and Transmission Control Protocol (TCP). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the object header generation and validation functionality of the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of logical units (LUNs) configured to store files, blocks, objects or other arrangements of data, each also generally referred to herein as a "data item," on behalf of users associated with host devices 202. Each such LUN may comprise particular ones of the above-noted pages of the user data area. The user data stored in the user data pages 422 can include any type of user data that may be utilized in the system 200. The term "user data" herein is therefore also intended to be broadly construed.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generating using hash functions are also referred to herein as "hash digests." The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. It should be noted that usage of the variable n in this user data page context is unrelated to its usage elsewhere herein.

Each of the user data pages 422 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The object header generation and validation functionality provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include object header generation and validation logic that engages corresponding object header generation and validation logic instances in all of the control modules 408C and routing modules 408R in order to implement an object header generation and validation process.

In some embodiments, the content addressable storage system 405 comprises an XtremIO™ storage array suitably modified to incorporate techniques for generation and validation of object headers for storing objects in an intermediate write buffer thereof as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, object header generation and validation functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device, illustratively one of the host devices 202. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement object header generation and validation functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with object header generation and validation functionality for storing objects in rite buffers as disclosed herein can provide a number of significant advantages relative to conventional arrangements.

For example, some embodiments provide techniques for efficient storage of large objects that violate constraints imposed by the memory components implementing write buffers of the storage systems. Illustrative embodiments advantageously avoid the need for maintaining separate partitions for data and metadata in the write buffer of a storage system.

Functionality for object header generation and validation can be implemented in a host device, in a storage system, or partially in a host device and partially in a storage system.

These and other embodiments can considerably reduce the amounts of computational and memory resources that are required to maintain multiple partitions in a write buffer, thereby leading to improvements in system performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with object header generation and validation functionality will now be described in greater detail with reference to FIGS. 5 and 6. Although described in the context of system 100, these platforms may also be used to implement at least portions of other information processing systems in other embodiments.

Figure 5:
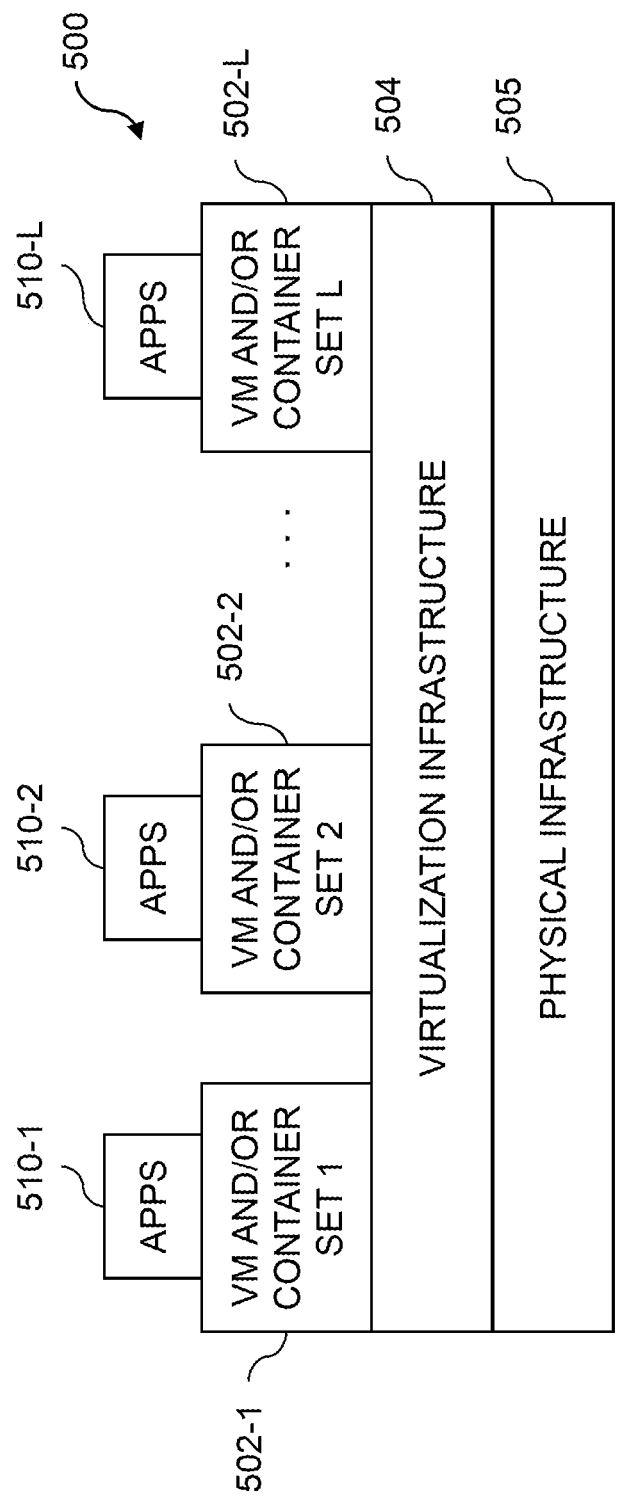
FIGS. 5 and 6 show examples of processing platforms that may be utilized to implement at least a portion of an information processing system in illustrative embodiments.
Figure 6:
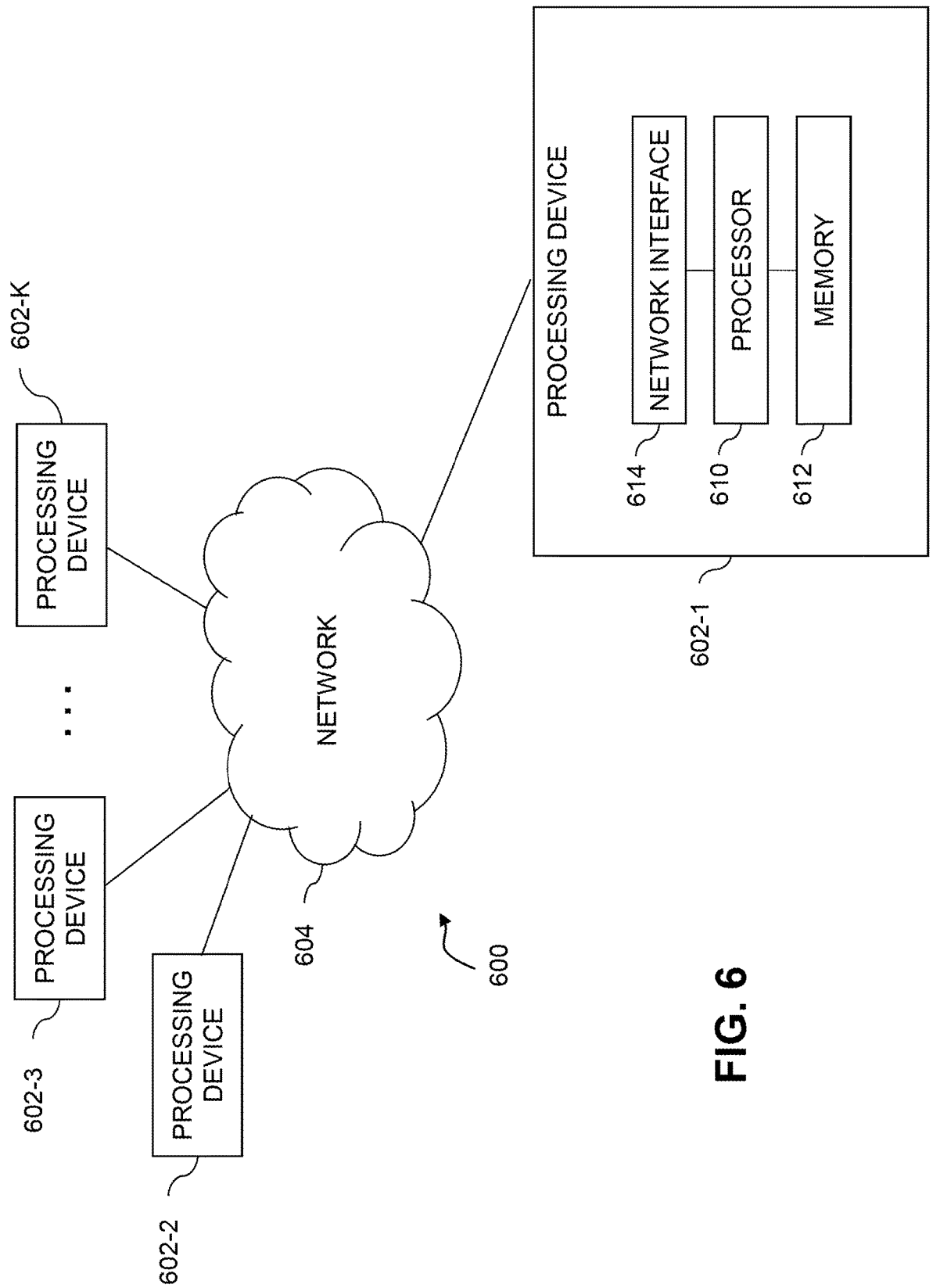

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide object header generation and validation functionality of the type described above for one or more processes running on a given one of the VMs. For example, each of the VMs can implement object header generation and validation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide object header generation and validation functionality of the type described above for one or more processes running on different ones of the containers. For example, a container host device supporting multiple containers of one or more container sets can implement one or more instances of object header generation and validation logic for use in storing data objects in a write buffer.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the object header generation and validation functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, write buffers, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the processing device being configured:
to receive a request to write a given data object to a write buffer of at least one storage system;
to allocate an entry in the write buffer for storage of the given object;
to generate a header for the given data object, the header comprising a first portion indicating a validation status of the given data object;
to write the header for the given data object to the allocated entry of the write buffer with the first portion of the header comprising a value indicating an invalid status for the given data object;
to write the given data object to the allocated entry of the write buffer; and
to update the header of the allocated entry by modifying the value of the first portion of the header to indicate a valid status for the given data object responsive to a successful write of the given data object to the allocated entry of the write buffer;
wherein the write buffer is associated with one or more size constraints for atomicity of writing data objects;
wherein a size of the header meets the one or more size constraints such that writing the header for the given data object to the allocated entry of the write buffer and updating the header of the allocated entry of the write buffer comprise atomic write operations; and
wherein a size of the given data object violates at least one of the one or more size constraints such that writing the given data object to the allocated entry of the write buffer does not comprise an atomic write operation.

2. The apparatus of claim 1 wherein the processing device is implemented in one of:
a host device configured to communicate over a network with said at least one storage system that comprises the write buffer; and
said at least one storage system that comprises the write buffer.

3. The apparatus of claim 1 wherein the allocated entry comprises an existing entry in the write buffer with a header having a first portion with a value indicating an invalid status for its associated data object.

4. The apparatus of claim 1 wherein the allocated entry comprises a new entry in the write buffer.

5. The apparatus of claim 1 wherein the header for the given data object further comprises a second portion indicating a unique identifier for the given data object.

6. The apparatus of claim 5 wherein the unique identifier for the given data object is provided by an application that is a source of the write request.

7. The apparatus of claim 5 wherein the unique identifier for the given data object comprises a first portion indicating an object type and a second portion indicating an object identifier.

8. The apparatus of claim 5 wherein the processing device is further configured:
to search the write buffer for an existing entry with a header having a second portion with the unique identifier for the given data object; and
to update the header of the existing entry by modifying a value of a first portion thereof to indicate an invalid status responsive to the successful write of the given data object to the allocated entry of the write buffer.

9. The apparatus of claim 1 wherein writing the given data object to the allocated entry of the write buffer comprises writing the given data object consecutively after the header in the allocated entry of the write buffer.

10. The apparatus of claim 1 wherein the processing device is configured to recover a journal provided by the write buffer utilizing validation status provided by first portions of headers in entries of the write buffer.

11. The apparatus of claim 10 wherein, when during recovery of the journal provided by the write buffer at least two entries thereof have headers with first portions indicating valid status for a same data object, selecting one of the at least two entries as a valid entry and invalidating remaining ones of the at least two entries by modifying values of the first portions of the headers thereof to indicate invalid status.

12. A method comprising:
receiving a request to write a given data object to a write buffer of at least one storage system;
allocating an entry in the write buffer for storage of the given object;
generating a header for the given data object, the header comprising a first portion indicating a validation status of the given data object;
writing the header for the given data object to the allocated entry of the write buffer with the first portion of the header comprising a value indicating an invalid status for the given data object;
writing the given data object to the allocated entry of the write buffer; and
updating the header of the allocated entry by modifying the value of the first portion of the header to indicate a valid status for the given data object responsive to a successful write of the given data object to the allocated entry of the write buffer;
wherein the write buffer is associated with one or more size constraints for atomicity of writing data objects;
wherein a size of the header meets the one or more size constraints such that writing the header for the given data object to the allocated entry of the write buffer and updating the header of the allocated entry of the write buffer comprise atomic write operations;
wherein a size of the given data object violates at least one of the one or more size constraints such that writing the given data object to the allocated entry of the write buffer does not comprise an atomic write operation; and
wherein the method is implemented by at least one processing device comprising a processor coupled to a memory.

13. The method of claim 12 wherein the header for the given data object further comprises a second portion indicating a unique identifier for the given data object, and further comprising:
searching the write buffer for an existing entry with a header having a second portion with the unique identifier for the given data object; and
updating the header of the existing entry by modifying a value of a first portion thereof to indicate an invalid status responsive to the successful write of the given data object to the allocated entry of the write buffer.

14. A computer program product comprising a non-transitory processor-readable storage medium having stored therein program code of one or more software programs, wherein the program code when executed by at least one processing device causes said at least one processing device:
to receive a request to write a given data object to a write buffer of at least one storage system;

to allocate an entry in the write buffer for storage of the given object;

to generate a header for the given data object, the header comprising a first portion indicating a validation status of the given data object;

to write the header for the given data object to the allocated entry of the write buffer with the first portion of the header comprising a value indicating an invalid status for the given data object;

to write the given data object to the allocated entry of the write buffer; and to update the header of the allocated entry by modifying the value of the first portion of the header to indicate a valid status for the given data object responsive to a successful write of the given data object to the allocated entry of the write buffer;

wherein the write buffer is associated with one or more size constraints for atomicity of writing data objects;

wherein a size of the header meets the one or more size constraints such that writing the header for the given data object to the allocated entry of the write buffer and updating the header of the allocated entry of the write buffer comprise atomic write operations; and wherein a size of the given data object violates at least one of the one or more size constraints such that writing the given data object to the allocated entry of the write buffer does not comprise an atomic write operation.

15. The computer program product of claim 14 wherein the header for the given data object further comprises a second portion indicating a unique identifier for the given data object, and further comprising:

searching the write buffer for an existing entry with a header having a second portion with the unique identifier for the given data object; and updating the header of the existing entry by modifying a value of a first portion thereof to indicate an invalid status responsive to the successful write of the given data object to the allocated entry of the write buffer.

16. The apparatus of claim 1 wherein a given one of the one or more size constraints for atomicity of writing data objects specifies a designated alignment size, and wherein the given data object exceeds the designated alignment size.

17. The apparatus of claim 1 wherein a given one of the one or more size constraints for atomicity of writing data objects specifies a designated alignment boundary size, and wherein the given data object crosses the designated alignment boundary size.

18. The apparatus of claim 1 wherein a given one of the one or more size constraints for atomicity of writing data objects specifies a designated maximum object size for atomic writes, and wherein the given data object exceeds the designated maximum object size.

19. The method of claim 12 wherein the one or more size constraints for atomicity of writing data objects comprise at least one of a designated alignment size, a designated alignment boundary size, and a designated maximum object size for atomic writes, and wherein the given data object at least one of exceeds the designated alignment size, crosses the alignment boundary size, and exceeds the designated maximum object size.

20. The computer program product of claim 14 wherein the one or more size constraints for atomicity of writing data objects comprise at least one of a designated alignment size, a designated alignment boundary size, and a designated maximum object size for atomic writes, and wherein the given data object at least one of exceeds the designated alignment size, crosses the alignment boundary size, and exceeds the designated maximum object size.

\* \* \* \* \*